Aug. 19, 1924.
H. C. HASTINGS
1,505,933
CONTROL OF ELECTRICALLY PROPELLED VEHICLES
Filed Sept. 20, 1922
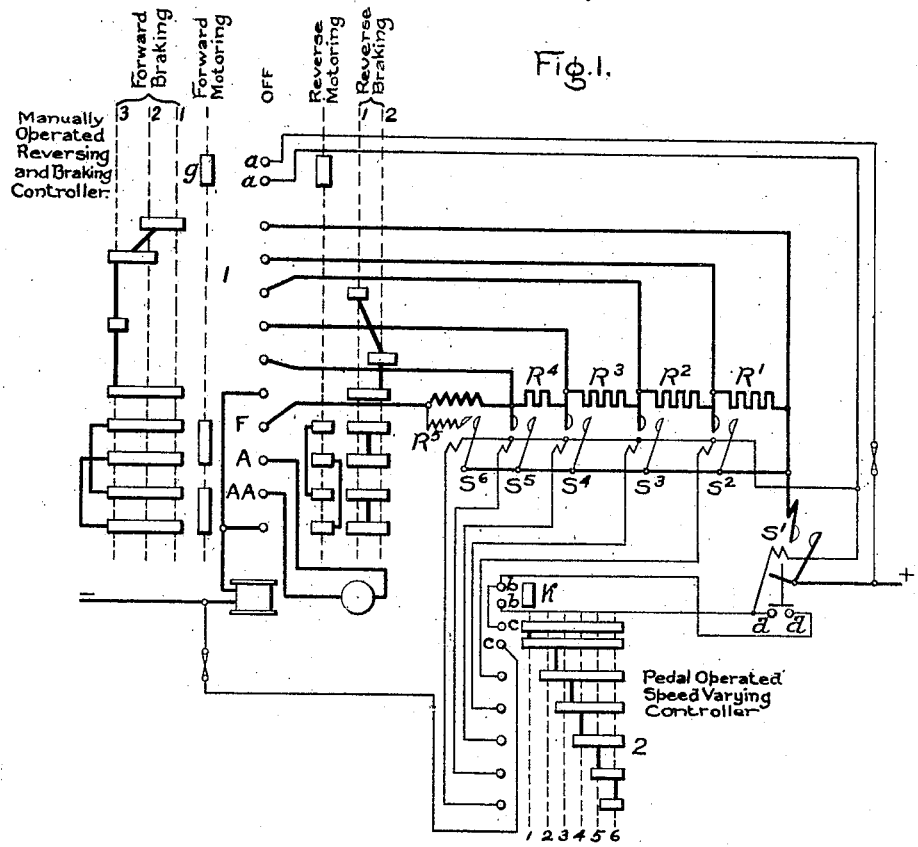
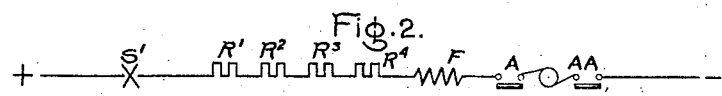
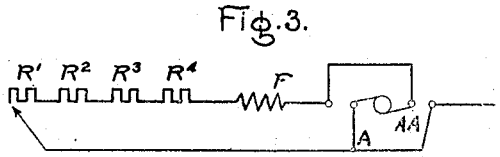
Inventor:
Hammond Charles Hastings;
by
His Attorney.

Patented Aug. 19, 1924.

1,505,933

UNITED STATES PATENT OFFICE.

HAMMOND CHARLES HASTINGS, OF RUGBY, ENGLAND, ASSIGNOR TO GENERAL ELECTRIC COMPANY, A CORPORATION OF NEW YORK.

CONTROL OF ELECTRICALLY-PROPELLED VEHICLES.

Application filed September 20, 1922. Serial No. 589,460.

*To all whom it may concern:*

Be it known that I, HAMMOND CHARLES HASTINGS, a British subject, residing at Rugby, in the county of Warwick, England, have invented certain new and useful Improvements in and Relating to the Control of Electrically-Propelled Vehicles, of which the following is a specification.

The invention relates to improvements in control systems for electric motors used for trolley buses or similar vehicles, and applies particularly to systems in which the driving motors are used as generators for braking in case of emergency.

The object of the invention is to enable such braking to be obtained with the least possible delay.

In order to leave the driver's hands free for steering it is desirable that the normal operations of starting and stopping should be controlled by a pedal-operated controller, spring-biased to the off position against the pressure of the driver's foot, a separate hand-operated lever being used for reversing the motor and for braking.

Systems of this kind are in use where a pedal-operated controller carries the main motor current and is used for connecting the motor to the line and cutting out the starting resistance. This controller is mechanically interlocked with a hand-manipulated lever which operates a second controller used for reversing and for braking, in a manner such that the spring-biased pedal-operated controller must be returned to the off position before the lever can be moved to the braking position. The pedal-operated controller is also used for controlling the degree of braking when the hand-operated lever is in the braking position. There are undesirable features in this scheme. In the first place braking cannot be obtained until the pedal-operated controller has moved to a certain position. This movement depends on a spring which may break, or the contacts of the controller, which carry the main current, may become so roughened due to arcing, that the spring exerts insufficient force to return it to this position. Also the interlocking mechanism due to wear may prevent the movement of the hand lever to the braking position. Thus, there may be delay in obtaining the braking connections due to several causes.

According to the present invention which is illustrated in the accompanying diagrams these undesirable features are eliminated. Fig. 1 of the drawing diagrammatically shows a motor control system having a speed varying controller and a reversing and braking controller arranged according to my invention; Fig. 2 is a simplified diagram of the low speed running connections of the motor; and Fig. 3 is a similar diagram of the braking connections of the motor.

In Fig. 1 of the drawing a pedal-operated master controller 2 is illustrated, the contacts of which carry only the small current required for operating contactors $S^1$, $S^2$, $S^3$, $S^4$ and $S^5$, and $S^6$. These contactors carry the main current used when the vehicle is being driven by power. Braking is obtained in case of emergency by the controller 1, the contacts of which carry the main current. This is operated by a hand lever and can be thrown to the braking position to give the correct braking connections irrespective of the position of the master controller 2.

The controller 1 is also used as a reversing switch and cooperates with the speed varying controller in controlling the connection of the motor to a source of supply. Controller 2 is shown as operable at will to any one of 6 points, five for controlling the starting resistances $R^1$, $R^2$, $R^3$ and $R^4$, and the sixth for obtaining increased speed by weakening the series field of the machine by means of diverter resistance. Controller 1 is shown as operable at will to a forward running power position and three braking positions, one reverse running power position and two braking positions. The connections are such that when braking no power is taken from the line. In order to run forward controller 1 is placed on the notch marked "forward motoring". This commutates the armature connections to give the correct direction of motion and also closes the two auxiliary contacts *a a*.

The pedal switch is now moved to the first position and the circuit of the operating coil of line contactor $S^1$ is completed from the positive line, through the contacts *a a* of controller 1, contacts *b b* and *c c* of controller 2 to the negative line.

Contactor $S^1$ closes and the motor is connected across the line in series with all the starting resistances. By moving the controller 2 to the succeeding notches the remaining contactors $S^2$, $S^3$, $S^4$, $S^5$ and $S^6$ can be closed in succession.

It will be seen that the arrangement of connections is such that $S^1$ can only be closed from the open position if the master controller 2 is on the first running position where all resistance is in circuit with the armature. When the master controller is moved past this position the segment $k$ leaves the fingers $b\ b$ and the closing circuit through $S^1$ cannot be made. When, however, $S^1$ has been closed there is a retaining circuit for its operating coil through the switch $d\ d$ and contacts $c\ c$ of the master controller 2 so that it will remain closed when the pedal switch is moved to any of the notches 2 to 6 inclusive unless the circuit be broken at contacts $a\ a$ of the braking controller 1. There is no mechanical interlock between the two controllers.

Assuming the master controller 2 is on one of the running notches, the car is running forward, and it is required to apply the emergency brake, the controller 1 is thrown from the forward power position to one of the forward braking notches. This at once connects the armature in series with its field and a certain amount of resistance, the machine generates and at once exerts a braking torque. It will be seen that this braking connection is obtained irrespective of the position of the master controller.

The power circuit is opened automatically when the controller 1 is moved to the braking notches due to the fact that segment $g$ opens circuit between contacts $a\ a$ and causes the line contactor $S^1$ and all the resistance contactors to open. The arrangement is thus fool proof and the driver has not to perform several operations before obtaining braking. The only operation required is that of throwing controller 1 from the power position to the braking position.

It will be seen that after applying braking in this way the pedal-operated master controller has to be returned to the first notch before the line contactor can be closed again, thus permitting all resistances to be inserted and ensuring that the armature is not connected across the line without such series resistance. Braking will be obtained even of the trolley has become dead as no current is required from the line for obtaining the braking circuit and no contactors are used for the braking connections. The connections corresponding to the first power point forward running are shown in Fig. 2 and for the first brake point forward running in Fig. 3.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A motor control system comprising a speed-varying controller operable at will to a plurality of operative positions for regulating the motor speed, a separately operable reversing controller operable at will to a plurality of operative positions for cooperating with said speed varying controller in controlling the connection of the motor to a source of supply and for independently connecting the motor in a dynamic brake circuit, and electrical connections whereby moving the said reversing controller from a motoring to a braking position disconnects the motor armature and field windings from the source of supply and connects the same in a dynamic brake circuit independently of the position of the said speed-varying controller.

2. A motor control system comprising resistance in the motor circuit, a speed-varying master controller having a plurality of operative positions for controlling the said resistance, contactors controlled thereby for varying the said resistance, a separately operable reversing controller for controlling the connection of the motor to a source of supply in certain of its operative positions and for controlling the connection of the motor in a dynamic brake circuit in other of its operative positions, and electrical connections whereby moving the said reversing controller to a braking position connects the motor in a dynamic brake circuit including the said resistance independently of the position of the said speed-varying controller.

3. A motor control system for an electrically-propelled vehicle, comprising a pedal operated master controller, contactors controlled thereby for controlling the motor speed under all conditions while motoring, a separate manually-operated controller for controlling the motor when operating as a generator to brake the vehicle, and electrical connections whereby the braking effect produced by the last-named controller is independent of the position of the said pedal-operated controller.

4. A motor control system for an electrically-propelled vehicle, comprising an electric motor, resistance in the motor circuit, a pedal-operated master controller having a plurality of operative positions contactors controlled thereby for varying the said resistance to regulate the motor speed under all conditions while motoring, a separate manually-operated controller for controlling the connection of the motor to a source of supply in certain of its operative positions and for controlling the connection of the motor in a dynamic brake circuit in other of its operative positions, and electrical connections whereby moving the said manually-operated controller to a braking position connects the motor in a dynamic brake circuit including said resistance independently of the position of the said pedal-operated controller.

In witness whereof, I have hereunto set my hand this 29th day of August, 1922.

HAMMOND CHARLES HASTINGS.

Witnesses:
JOHN HALFORD,
J. A. FOSTER.